United States Patent
Maggi et al.

(10) Patent No.: US 7,380,578 B2
(45) Date of Patent: Jun. 3, 2008

(54) QUICK-FIT ANTI-SKID SYSTEM FOR VEHICLE WHEELS AND ASSOCIATED DEVICE FOR FIXING TO THE WHEEL

(75) Inventors: Corrado Maggi, Sirtori (IT); Jean Pierre Bouvier, Le Mont sur Lausanne (CH)

(73) Assignee: Maggi Catene S.p.A., Olginate (Lecco) (IT)

( * ) Notice: Subject to any disclaimer, the term of this patent is extended or adjusted under 35 U.S.C. 154(b) by 323 days.

(21) Appl. No.: 10/533,139

(22) PCT Filed: Jul. 21, 2003

(86) PCT No.: PCT/IB03/02898

§ 371 (c)(1),
(2), (4) Date: Apr. 29, 2005

(87) PCT Pub. No.: WO2004/039611

PCT Pub. Date: May 13, 2004

(65) Prior Publication Data

US 2005/0284555 A1 Dec. 29, 2005

(30) Foreign Application Priority Data

Oct. 29, 2002 (CH) .................................... 1817/02

(51) Int. Cl.
*B60C 11/00* (2006.01)
(52) U.S. Cl. .................... 152/216; 152/225 C
(58) Field of Classification Search ............ 152/213 R, 152/216–218, 221–222, 225 C
See application file for complete search history.

(56) References Cited

U.S. PATENT DOCUMENTS

| 4,386,643 A | * | 6/1983 | Belknap et al. | ............. 152/216 |
| 4,388,754 A |   | 6/1983 | Ilon | |
| 4,576,214 A | * | 3/1986 | Preusker | ................. 152/213 A |
| 5,254,187 A | * | 10/1993 | Metraux | ..................... 152/216 |
| 5,309,968 A | * | 5/1994 | Yoshida | ..................... 152/219 |

FOREIGN PATENT DOCUMENTS

| CH | 689 206 | 12/1998 | | |
| EP | 0 214 623 | 3/1987 | | |
| EP | 0 460 782 | 12/1991 | | |
| EP | 0 496 702 | 7/1992 | | |
| EP | 528506 A1 | * | 2/1993 | ............. 152/213 R |
| JP | 63145111 A | * | 6/1988 | ............. 152/213 R |

* cited by examiner

Primary Examiner—Jason R Bellinger
(74) Attorney, Agent, or Firm—Young & Thompson

(57) ABSTRACT

An anti-skid system for vehicle wheels includes gripping elements which are intended to make contact with the tread of the wheel and are arranged at the free ends of arms joined to a central connecting body, a clamping element (15) apt to be fastened to the rim of the wheel, and a constraining assembly able to establish a connection between the arms (21, 22) and the clamping element (15), the arms (21, 22) being in the form of flexible laminar strips and the constraining assembly including at least one linear traction member (30) which is non-extendable, but adjustable lengthwise; an advantageous clamping element (15) which makes the system more cost-effective and mounting thereof on the wheel more convenient is also described.

17 Claims, 8 Drawing Sheets

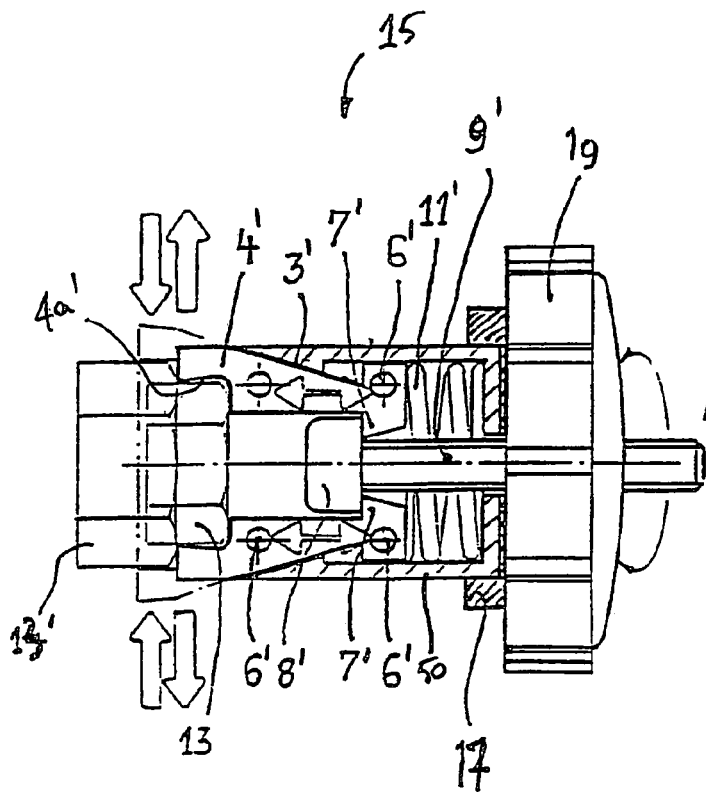
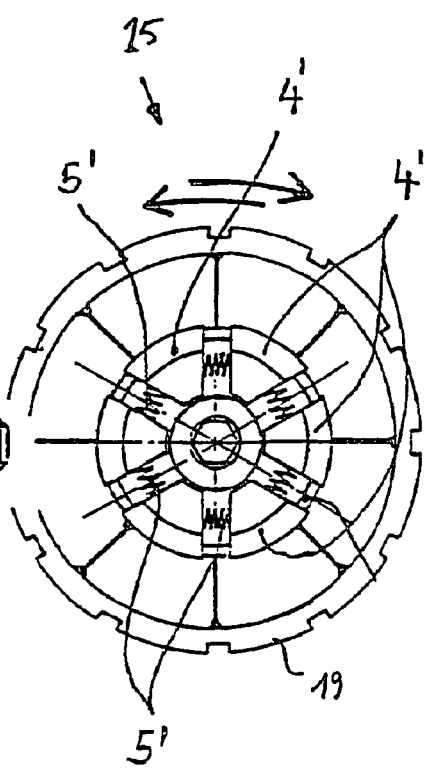
Fig. 7A                    Fig. 7B
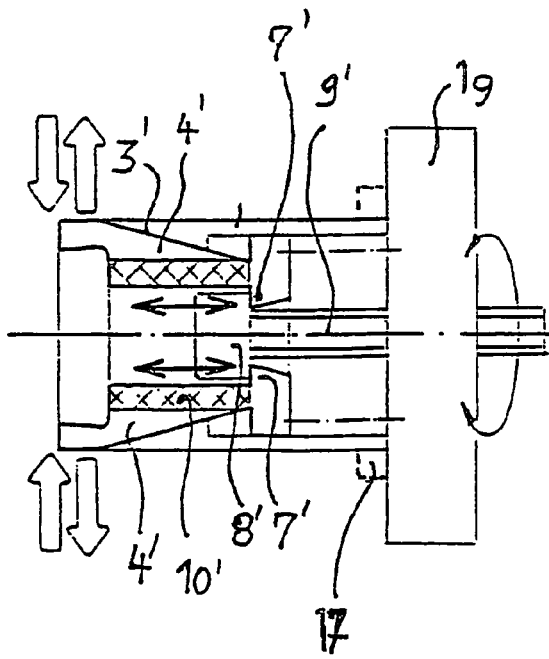
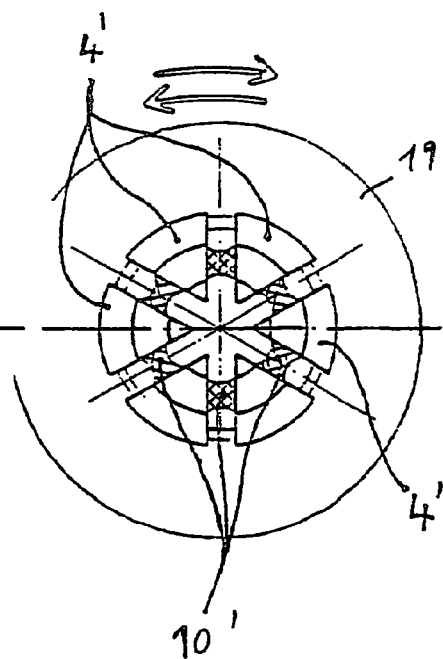
Fig. 8A                    Fig. 8B

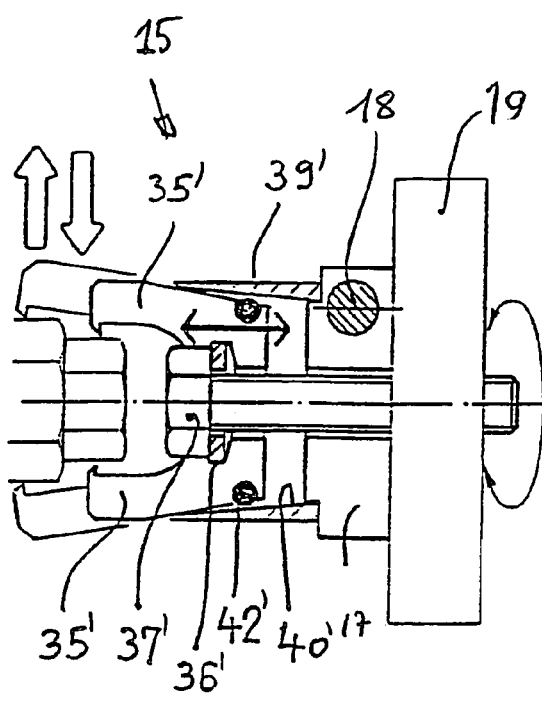
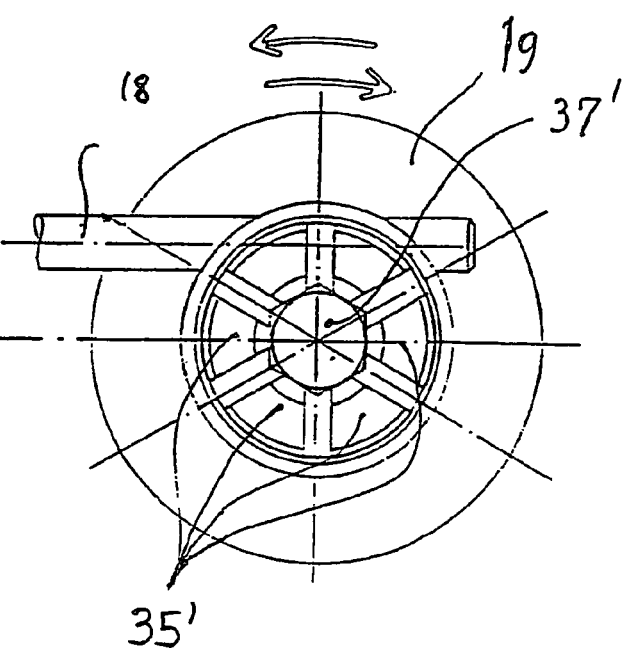
Fig. 13A
Fig. 13B

QUICK-FIT ANTI-SKID SYSTEM FOR VEHICLE WHEELS AND ASSOCIATED DEVICE FOR FIXING TO THE WHEEL

BACKGROUND OF THE INVENTION

Field of the Invention

The present invention relates to an anti-skid system for vehicle wheels, in particular a system with radial support elements, which is intended to be placed on the wheel of a vehicle and positioned automatically on the tire upon the first revolutions during movement of the vehicle. The invention also relates to a device for fixing this system, apt to be clamped onto a bolt of the wheel rim.

Some known anti-skid systems are described in EP-496,702 and CH-689,206, which are regarded as incorporated herein by way of reference.

In these known devices, four radial support elements of a snow-chain converge towards a central connecting body. The latter is then resiliently fastened in various ways to a system ensuring constraining to a bolt of the wheel rim.

In these systems, moreover, it is provided that the fixing mechanism to the bolt of the rim is in the form of a bush-like body through which the constraining system is fitted.

The bush is composed of a jaw-like arrangement which can be clamped onto the bolt by screwing a liner onto a deformable internal body. The bush is fixed onto the bolt of the rim by way of a preliminary operation before mounting the whole anti-skid system onto the wheel. Since, however, this operation must be performed with the aid of a tool and is somewhat difficult, normally it is performed at the start of the winter season and the bush is then left for a long period of time mounted on the vehicle rim, with the drawbacks which can be imagined. Following this operation, at need (for example in the case of snow on the road), the motorist must attach to the bush the remaining portion of the anti-skid system, which is that intended to provide the tire with adequate grip to the slippery road surface.

In addition to the difficulty mentioned above there is a further problem associated with the arrangement of the bush. Since tightening onto the bolt is performed by means of partial deformation of the internal element of the bush, obtained through helical coupling of the screw/female thread type, it is not possible to achieve a good tightening action on a wide variety of bolts of varying sizes. Consequently, it is required to envisage a specific bush (also called "fix" in the technical jargon) for each bolt size. This means that, during purchase, the user must find out the bolt size on his/her vehicle and supply this information to the sales outlet so that they can provide the right equipment. As can be imagined, this procedure is inconvenient and may be a source of errors both for the sales outlet (who among other things must keep a larger number of articles in stock) and for the purchaser.

Moreover, some users may encounter difficulties at the time of mounting the actual anti-skid system onto the bush previously fastened to the bolt. In fact, with one hand it is required to keep the anti-skid system positioned and pressed against the tire of the wheel while, at the same time, with the other hand a coupling lever or cotter pin must be engaged with the bush already mounted on the bolt and situated behind the radial support elements.

SUMMARY OF THE INVENTION

The object of the present invention is therefore that of overcoming these drawbacks and providing an anti-skid system, mounting of which is even easier than that of the devices already proposed.

A further object of the invention is to provide a fixing bush or clamping element which can be easily fastened to and removed from the wheel bolt and which is available as a single, sufficiently low-cost kit which can be adapted by the final user to the specific bolt of the rim.

A further object of the invention is to provide a further improved fixing bush which can be fastened, without any modification, to bolts within a wide range of sizes.

The abovementioned objects are achieved, according to the invention, by an anti-skid system.

In particular, the anti-skid system according to the invention thus no longer has any resilient element arranged between the rim and the connecting body for exerting a pulling force on the system. This pulling and/or tensioning force is obtained, instead, by using arms with a suitable shape and elasticity which are tensioned by means of an adjustable constraining device consisting of a non-extendable linear traction member, such as a chain or a cable, which joins the constraining lever to a connecting body of the arms which is designed with a suitable structure.

According to an important aspect of the invention, moreover, the clamping device, which is intended to be removably fixed onto the wheel bolt, has an external body, a removable internal body as well as an operating member, which are configured and coupled together in such a way as to make the fixing and removal operation much easier.

According to another aspect, the internal body is not removable, but is configured in such a way as to be universally applicable to a wide range of bolts of various sizes.

BRIEF DESCRIPTION OF THE DRAWINGS

Further characteristic features and advantages of the system according to the invention will nevertheless appear more clearly from the detailed description which follows of some preferred embodiments thereof, provided by way of example and illustrated in the accompanying drawings, in which:

FIGS. 7A and 7B are, respectively, a partially sectioned side elevation view and front elevation view of a preferred embodiment of the clamping element according to the invention; and FIGS. 8A, 8B to 13A, 13B are, respectively, views similar to those of FIGS. 7A and 7B of further embodiments of the clamping element.

DESCRIPTION OF SOME PREFERRED EMBODIMENTS

Figures 1, 2:
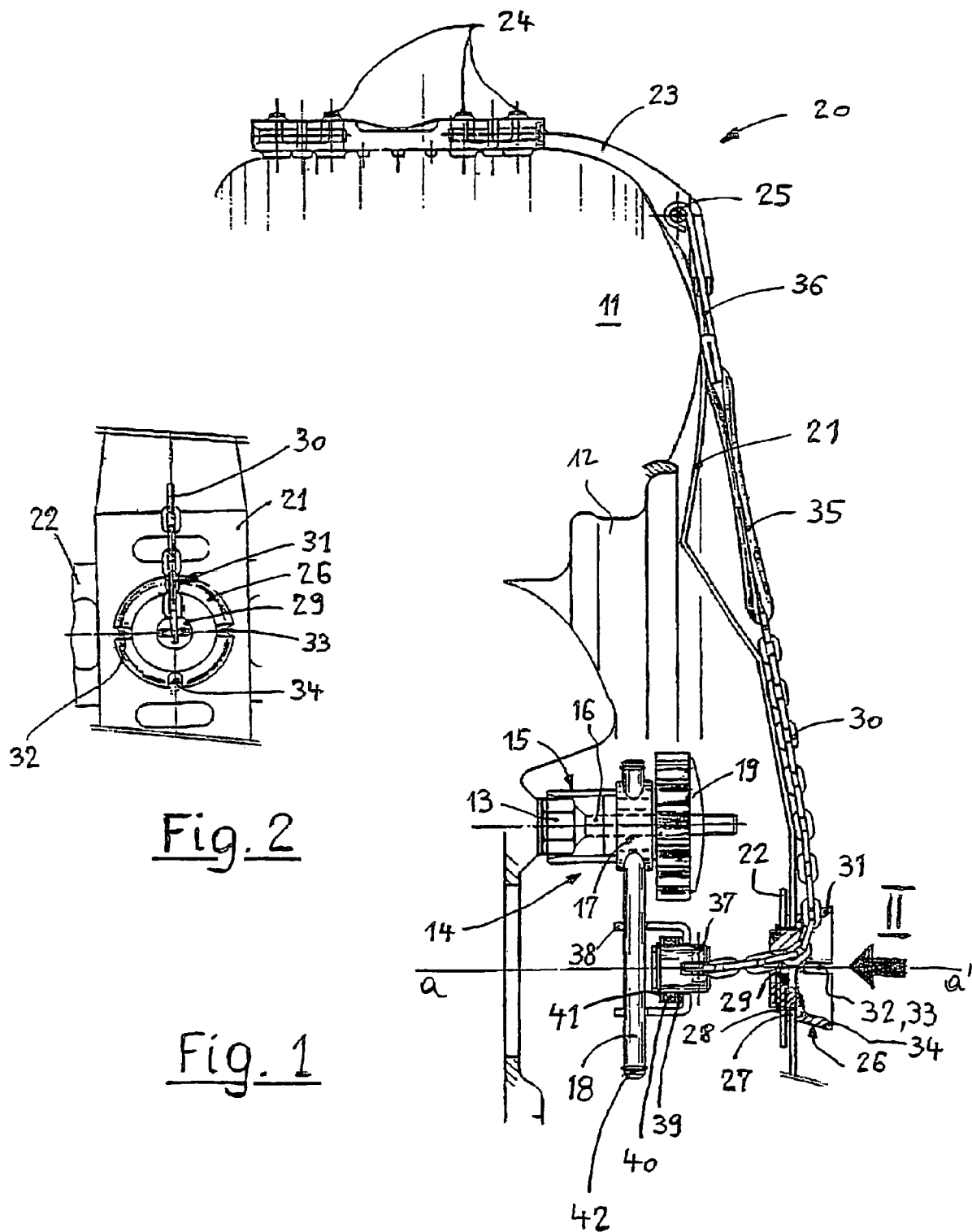
FIG. 1 is a side elevation view, partly sectioned, of a vehicle wheel equipped with a system according to the invention.
FIG. 2 is a partial front elevation view of the connecting body of the system according to FIG. 1, in the direction of the arrow II.

As can be seen in the cross-section of FIG. 1, a vehicle wheel comprises a tire 11 and a rim 12 provided with fixing bolts 13 which connect the rim to the axle of the vehicle. A constraining assembly 14, which will be described in greater detail below, is mounted in a removable manner on one of the bolts 13 of the wheel.

The constraining assembly 14 comprises a clamping element 15 which is intended to clamp the bolt 13 and from which there extends a threaded shank 16 which passes through a circular collar 17 supporting a coupler lever or rod 18. The coupler rod 18 is arranged eccentrically on the collar 17 and extends towards the center of the wheel, extending also a certain distance beyond it. The clamping element 15 is fastened to and removed from the bolt 13 by means of an operating member 19, such as a rotating knob, operation of which will be illustrated in detail further below.

According to the invention, the rod 18 is freely slidable inside the seat of the collar 17, but cannot be completely extracted from it, for example as a result of retaining rings 42 arranged at its ends.

Moreover, on the portion directed towards the center of the wheel, the rod 18 carries on a bracket 38, which is also free to slide longitudinally on the rod 18 and to which the end of a non-extendable tensioning member, for example the chain 30 shown in the figures, is firmly attached.

Preferably this end of the chain 30 is constrained to the bracket 38 also by means of vibration damping means 40 which are shown in the form of a ring of synthetic material and a clip 41.

At its other free end the chain 30 has a rubber piece 35 (FIG. 1) which is intended to be hanged to a hook 36 mounted to a hinging pin 25 of the anti-skid system which will be seen further below.

The rubber piece 35 does not have the function of interacting with the chain 30 in order to perform tensioning of the system on the vehicle wheel, but simply has the function of keeping it to the wheel so that it is not free to move and strike components during rotation of the wheel.

The anti-skid system 20 also comprises two arms 21, 22 (FIG. 2) which are arranged approximately at 90° with respect to each other when the system is operationally mounted on the wheel. The actual anti-skid component, for example four plates 23 provided with spikes 24 and connected to chain sections (not shown), is fastened to each end of the arms 21, 22.

This part of the anti-skid system will not be described in greater detail in this application since it is understood that its components are known to the person skilled in the art and for example are described in CH-689,206.

The arms 21 and 22 are preferably formed by resilient, metal, laminar strips and are mounted rotatably at their center on a central connecting body 26 which may be made of metal or sufficiently rigid plastic material.

The two arms 21 and 22 are for example supported on a circular race of the body 26 and are separated by a thin clip-like spacer 28, such as an elastic ring.

The arms have the singular shape clearly shown in FIG. 1, namely comprising an elbow portion which is intended to be arranged in contact with the rim 12 when the system is tensioned making use of the inherent elasticity of the arms.

The connecting body 26 has a generally flared shape and is provided at the centre with a hole 29 through which the chain 30 is intended to pass. The flared connecting body 26 has, at its inlet mouth, a series of four grooves 31, 32, 33 and 34 (FIG. 2) which are situated at about 90° with respect to each other; the grooves are intended to receive edgewise a link of the chain 30 so as to prevent it from coming out when tensioned.

Now that the overall structure of the system according to the invention has been described, the operating principle thereof can be easily understood.

Firstly, the constraining assembly 14 is fixed onto a bolt of the wheel rim by suitably operating the tightening knob 19. This operation may be easily performed also using both hands.

Then, in a conventional manner, the remaining portion of the anti-skid system is brought up to the wheel, causing the actual snow-chain together with the associated gripping elements to hug the tire as closely as possible. During this operation, the chain 30 remains loose. At this point pressure is applied to the connecting body 26, moving it closer to the rim and tensioning the arms 21, 22; once the desired position has been reached, the chain 30 is taken up and tensioned and folded back along one of the arms, inserting the connecting link into one of the grooves 31-34 of the body 26 as to lock it in position. In order to prevent the remaining free portion of the chain from banging during the rolling movement of the wheel, the end of the chain provided with the rubber part 35 is fastened to the hook 36.

Finally, it is possible to start again with the vehicle, allowing the anti-skid system to fit properly around the tire owing the elastic return force which is constantly exerted by the arms 21, 22 which are under tension.

When it is required to remove the anti-skid system, it is sufficient to release the chain 30 by extracting it from the groove 31 and exerting a pulling force on the top part of the chain adhering to the tire, thereby freeing the top and side areas of the chain. Then the vehicle need be moved forward one half revolution of the wheel in order to be able to remove the system and place it back into its container.

As can be understood, the technical solution proposed is extremely satisfactory because, on the one hand, it results in a much simplified assembly sequence, leaving both hands free for each operation, and, on the other hand, by making efficient use of the elasticity of the arms alone, it avoids the use of separate resilient elements for exerting the desired holding force. In fact, problems of wear or breakage of these resilient parts are thereby avoided. The person skilled in the art will easily understand that the resilient piece 35 allows fastening of the end of the chain 30 in a simple manner so that the latter is unable to strike the sides of the vehicle wheel, but said piece is not subject to any significant degree of tension and, consequently, will never result in any problems.

Moreover, owing to the ease of operation of the operating knob 19, it is possible to fix and remove without difficulty the entire constraining assembly, which may therefore be mounted only when required and not left on the wheel rim for the whole winter season.

Figure 3:
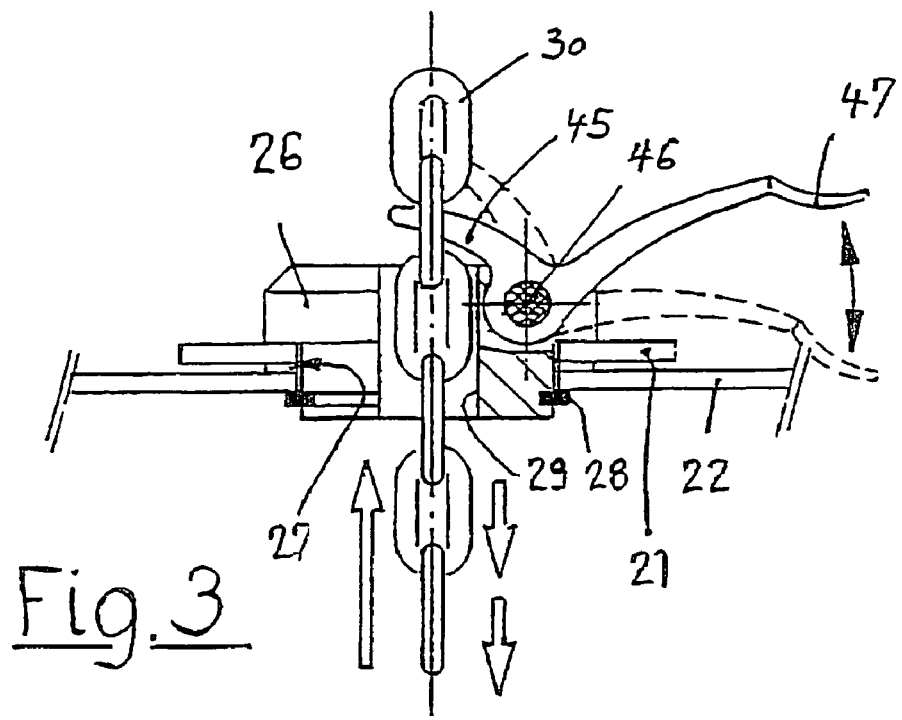
FIG. 3 is a partial sectional view of an alternative embodiment of the connecting body according to FIG. 2.
Figure 4:
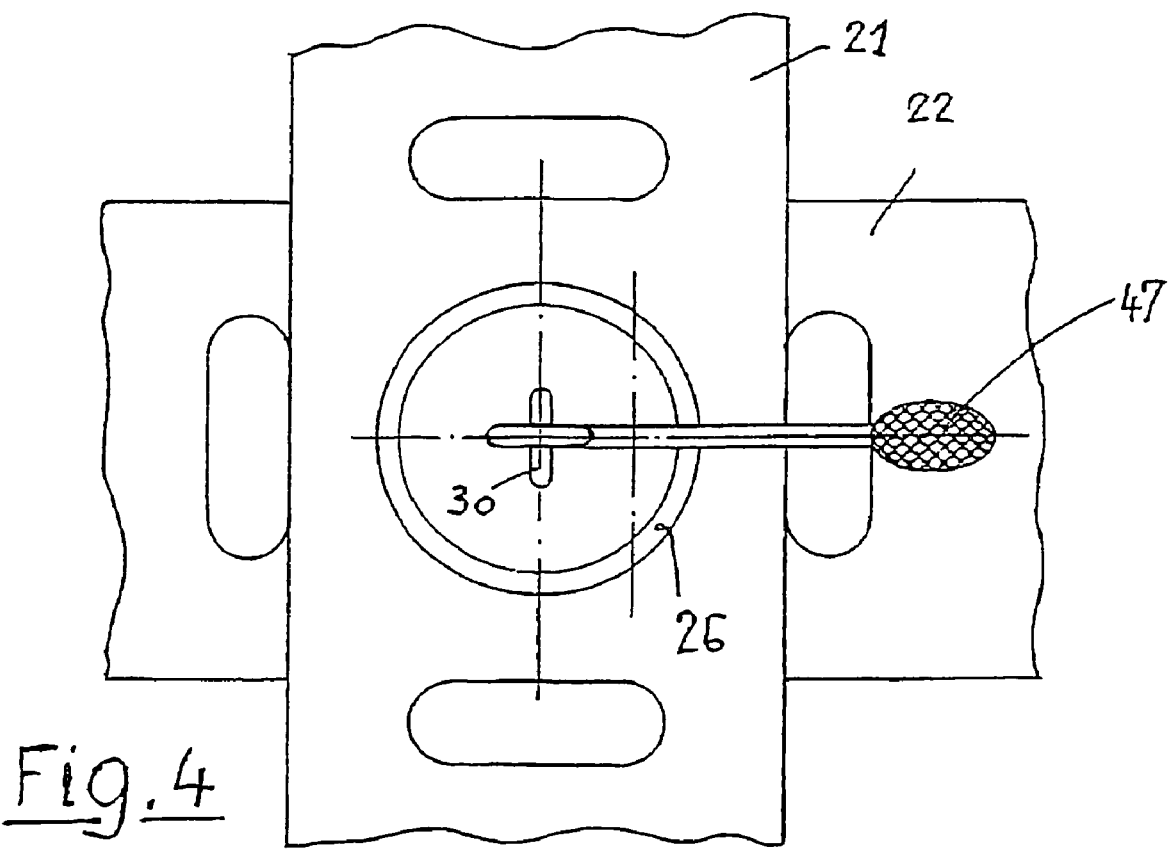
FIG. 4 is a front elevation view of FIG. 3.

FIGS. 3 and 4 show a variant of the connecting body 26. As in the previous embodiment, the central support 26 has a hole 29 through which the chain 30 passes. In this embodiment, however, the grooves 31-34 intended to retain a link of the chain are replaced by an engaging device formed by a hook 45, pivoting about a pin 46 of the body 26 and joined to an actuating lever 47.

The operating principle of the variation of the tightening device described here is extremely easy to understand. The lever 47 is kept lowered so as to move the hook 45 away from the path of the chain 30 until the anti-skid system has been mounted on the wheel and the arms 21, 22 have been tensioned. Then the hook 45 is inserted into a link of the chain 30 and the chain is slackened by that small amount needed to lock together the hook 45, the chain link and the body 26 so as to prevent further slackening and lock the chain on the body. The arms 21 and 22 are thus tensioned and the system is applied against the wheel. Simple pressure of the lever 47 then allows the chain 30 to be released during disassembly.

Figure 5B:
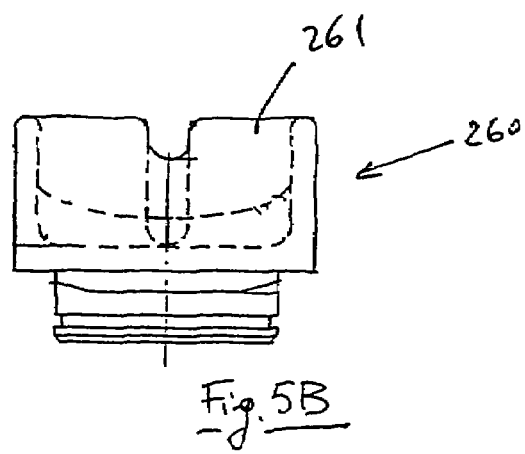
FIGS. 5A, 5B and 5C are, respectively, a top plan view, front elevation view and longitudinal section view along the line V-V of an alternative embodiment of the connecting body according to FIG. 2.
Figure 5A:
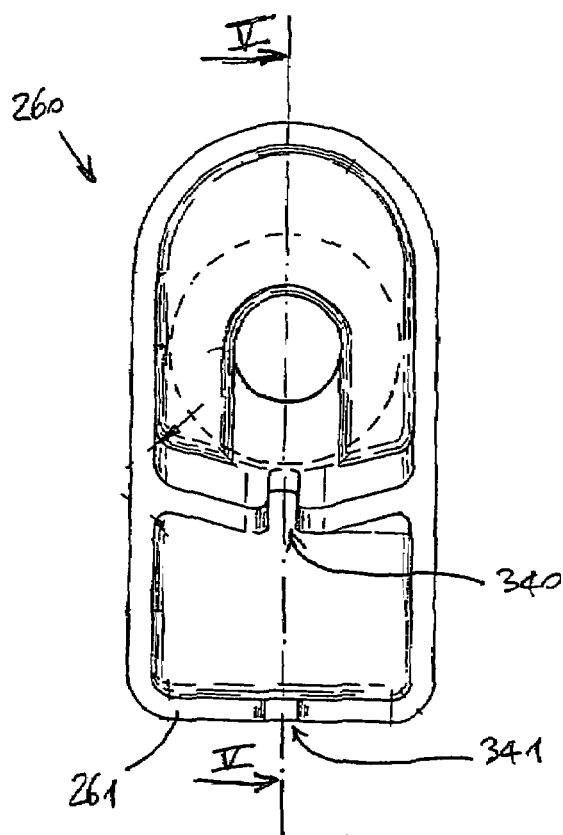
Figure 5C:
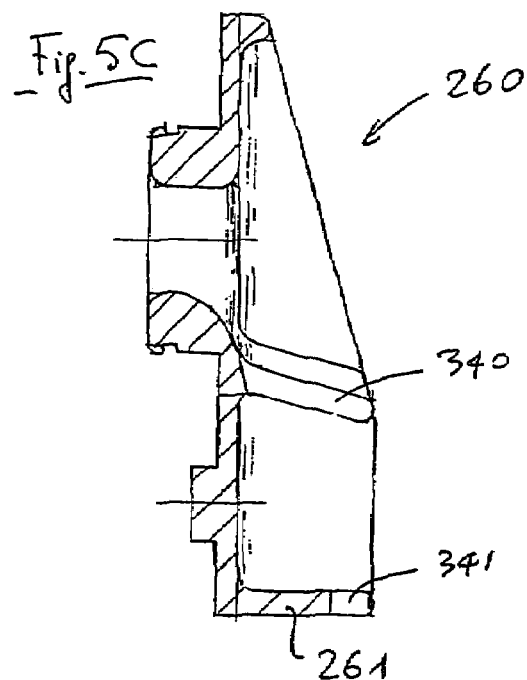

FIGS. 5A-5C show a further preferred embodiment of the connecting body. Here the flared body 260 has a single groove 340 and, in the vicinity thereof, there extends an extended portion provided with a raising lip 261 also provided with a groove 341.

In this way, the chain 30 is laid down and locked always in the same direction, but is kept raised from the underlying arm 21, 22 along a significant portion thereof. As a result it is possible to avoid the need for shock-absorber inserts arranged along at least one of the arms 21, 22 so as to protect them against the vibrational impact with the chain which would end up damaging and impairing the surface finish.

Figure 6A:
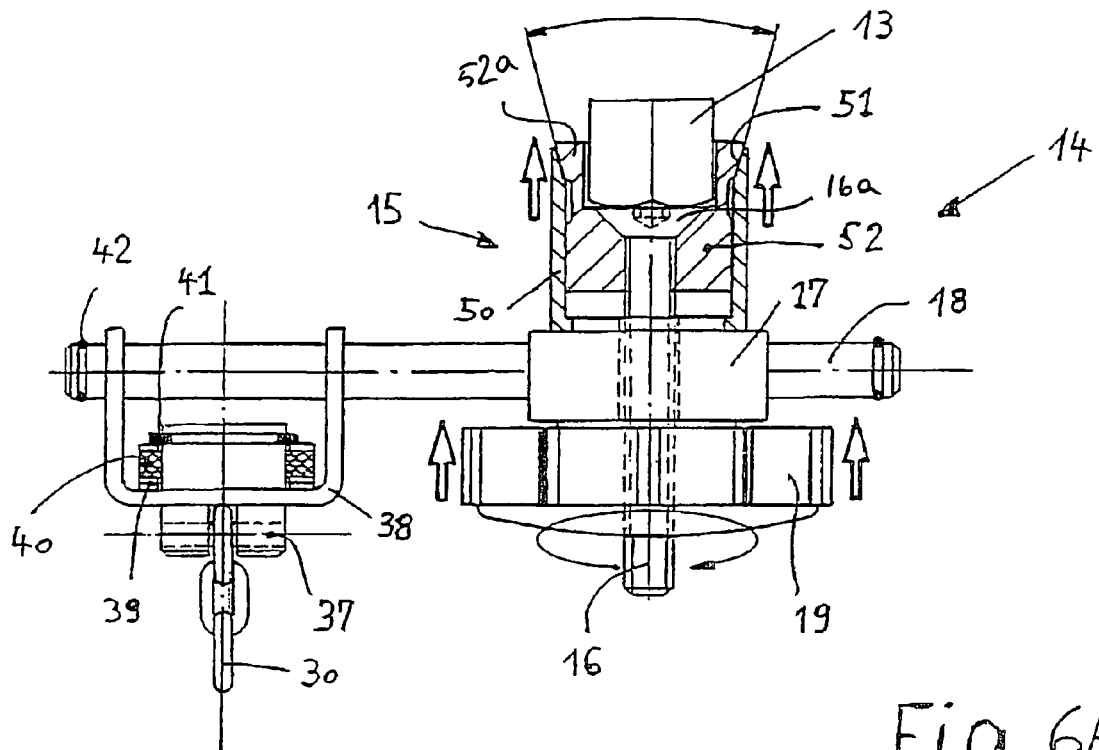
FIGS. 6A and 6B are, respectively, a top plan view and front view which show in detail the constraining element in its entirety fastened to the bolt of a vehicle wheel.
Figure 6B:
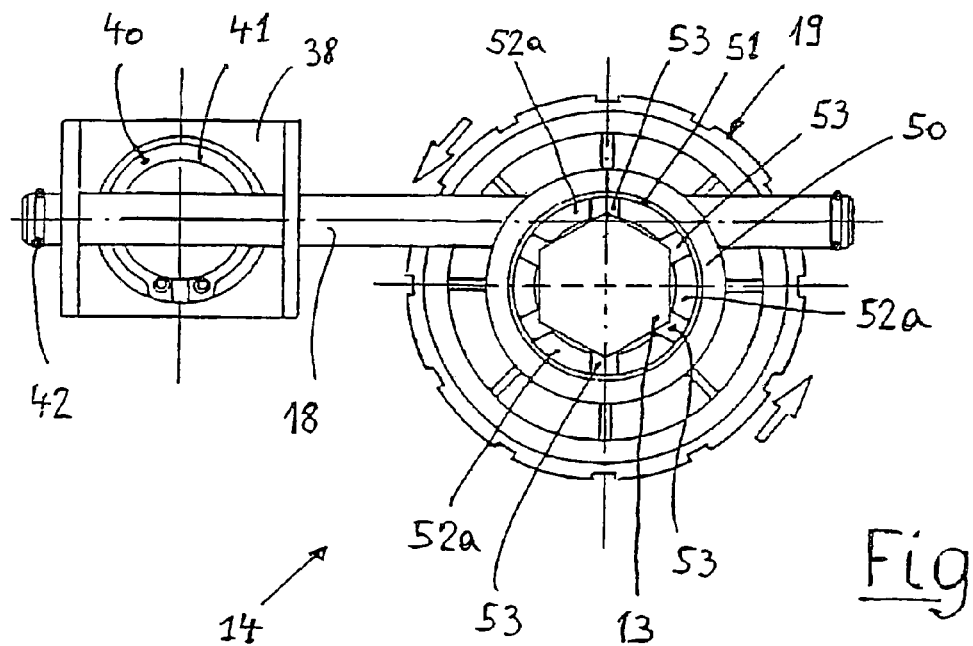

FIGS. 6A and 6B show in greater detail a preferred embodiment of the clamping element 15 according to the invention.

A bell-shaped body 50 extends integrally with the collar 17. The walls of the bell-shaped element 50 have an internal chamfer 51 in the region of the inlet mouth.

The bell-shaped element 50 houses internally a sleeve 52 provided with a series of petals (fingers) 52a able to close together, clamping in the middle the head of a bolt 13 or 14. Each petal (finger) 52a has an inclined external surface intended to complementary mate with the internal chamfered surface 51 of the bell-shaped element 50. Owing to this design, the clamping element 15 is able to clamp the bolt 13 as the engaging action between the sleeve 52 and the bell-shaped element 51 increases (namely as the sleeve moves in the opposite direction to the arrows shown in FIG. 6A).

In order to establish this relative displacement between the sleeve and the bell-shaped element, a threaded tie-rod 16 is provided, said tie-rod being integral, at least in the direction of longitudinal traction, with the sleeve 52. For example the tie-rod 16 is a threaded screw with a head 16a engaged in a suitable seat of the sleeve 52. At the opposite end of the threaded tie-rod 16, beyond the collar 17, the operating knob 19 is screwed.

Screwing of the knob 19 causes pulling of the screw 16 to the right and therefore tightening of the clamping element 15 onto the bolt 13. Since the knob 19 has relatively large dimensions, tightening of the system onto the bolt 13 is extremely effective.

According to a preferred embodiment, the sleeve 52 may be designed as a replaceable or interchangeable part. Between one sleeve and another, the hole for insertion of the tie-rod 16 remains identical, but the thickness of the petals 52a changes: in this way it is sufficient to envisage a series, for example, of three different sleeves 52 in order to be able to use the clamping element for the whole range of bolts 13 available on commercially produced vehicles. Since the sleeve 52 is an extremely simple and low-cost component, it is possible to provide the purchaser with the complete series in the same package, without a substantial increase in costs, thus achieving full compatibility of the same product with a wide range of vehicles.

Finally, the angle of opening α of the inclined mating surface between the inner sleeve 52 and the bell-shaped body 50—which angle is identical for all the different sleeves which may be provided—is chosen so as to be able to achieve an effective tightening action, without however requiring an excessive force on the part of the person who must operate the operating knob 19. This angle α is preferably in the range of 10° to 30°.

Some further preferred embodiments of the clamping element 15 will now be described. In the figures identical reference numbers have been assigned to like elements.

In the first embodiment shown in FIGS. 7A and 7B, the clamping element comprises a central bell-shaped body 50 within which there is formed a chamfer portion 3' against which a series of independent clamping blocks 4' forming a gripping jaw are intended to slide.

As is clearly shown in FIG. 7B, the gripping jaw is preferably composed of six independent clamping blocks 4' connected together by means of compression springs 5' arranged in lateral holes 6' provided in the two end portions of each clamping block.

The internal ends of the clamping blocks 4' have spurs 7' which are directed towards the longitudinal central axis and against which the undercut portion of a head 8' of a tightening screw 9' engages. The tightening screw 9' has, screwed thereon, the operating knob 19 which acts in opposition to the collar 17 (only schematically shown in these figures) to which the bell-shaped element 50 and the constraining rod 18 are joined.

A spring 11' is arranged between the clamping blocks and the bottom of the bell-shaped body 50.

According to a particular feature of the invention, moreover, the external retaining end of the clamping blocks 4' has a stepped shape, as can be clearly seen from FIG. 7A. Preferably the side surface 4a' of the stepped-shaped ends is slightly flared so as to have a radial distance from the central axis of symmetry which decreases outwards.

The clamping element is intended to be tightened around a bolt 13 or otherwise onto a larger-size bolt 14. In fact, owing to the specific shape of the stepped ends of the clamping blocks 4', the jaws formed by them is able to hold adequately bolts within a wide range of sizes—at least all those which may be envisaged on standard vehicles.

The rotation of the knob 19 causes axial displacement of the screw 9' and therefore the extraction or retraction of the clamping blocks 4' from/into the body 50 in opposition to the spring 11'.

Advantageously the anti-clockwise rotation of the knob 19 "opens" the gripper formed by the clamping blocks 4', i.e. or releases the head 8' of the screw which moves to the left (in the figure) as a result of the bias of the spring 11' which also pushes the clamping blocks 4' towards the external portion of the body 2', freeing the bolt; conversely, the clockwise rotation of the knob 19 causes the movement of the clamping blocks 4' towards each other and therefore firm tightening of the clamping element 15 to the bolt.

This device is extremely simple and, as already mentioned above, may be designed so as to hold bolts of different widths. The various components may be made, for example, of pressed metal and the holes 6' obtained by means of punching.

In the embodiment shown in FIGS. 8A and 8B, instead of the holes 6' and the compression springs 5', the individual clamping blocks are kept together by bridge-pieces made of rubber or synthetic material 10'. Said bridge-pieces, which have a certain elasticity, are joined to the clamping blocks 4' by means of vulcanization, gluing or mechanical fixing.

Figures 9A, 9B:
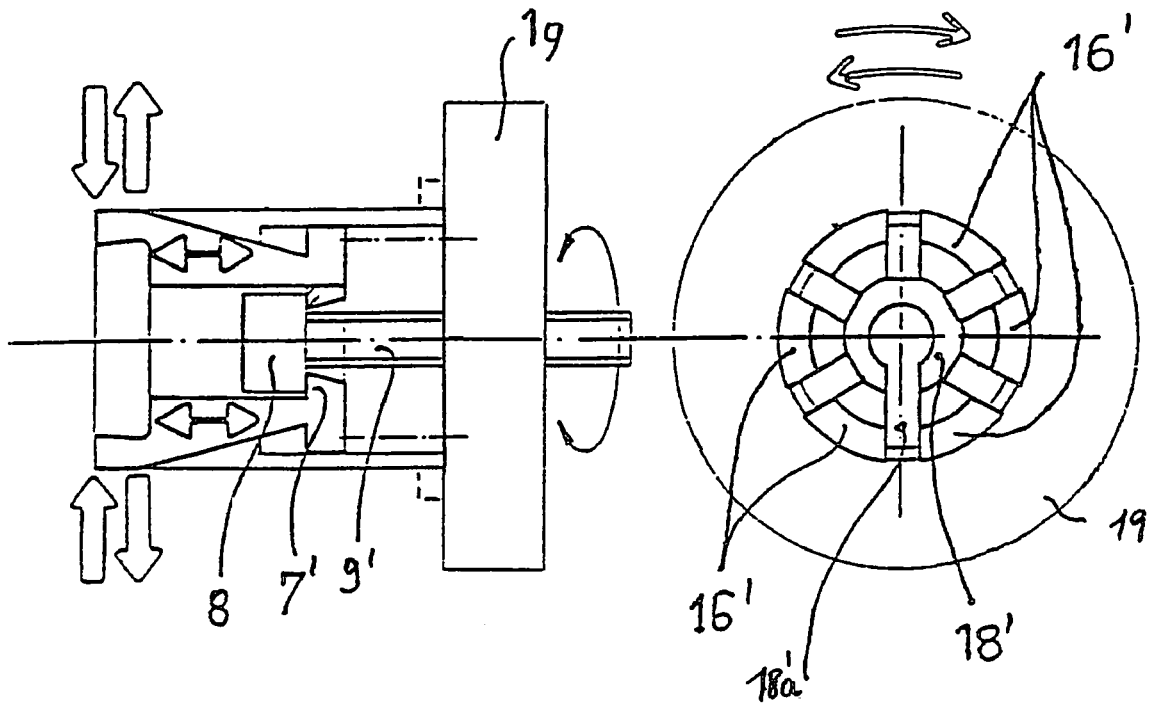

The embodiment according to FIGS. 9A and 9B has a clamping element composed essentially of the same components as the two preceding embodiments. However, in this case, the six clamping blocks 16' of the gripper are made as one piece which has a common annular body 18', on the inner base of the clamping blocks, provided along the whole of its height with a slit 18a' which allows the two clamping blocks adjacent thereto to move away from and towards each other. The six clamping blocks 16' are kept together by the annular body 18' which has small dimensions and therefore ensures a sufficiently elastic connection, in particular if the metal from which it is made is chosen in a suitable manner. This part may be made of light alloy or resilient steel.

Figures 10A, 10B:
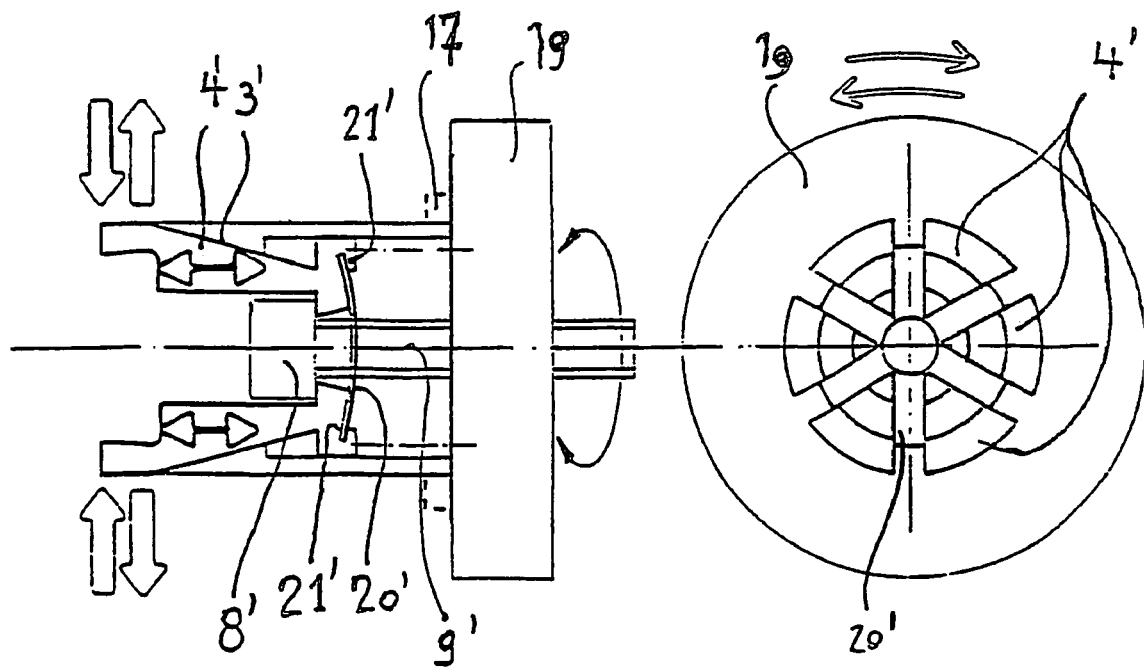

In the embodiment shown in FIGS. 10A and 10B the six clamping blocks 4' are joined together by means of a resilient washer or Belleville washer 20' which is made of a resilient metal. This spring washer 20' is housed inside slits 21' formed on the inner base of the clamping blocks 4', the abovementioned clamping blocks being able to be introduced inside the body 2 when the retaining spring 20' is under precompression.

Figures 11A, 11B:
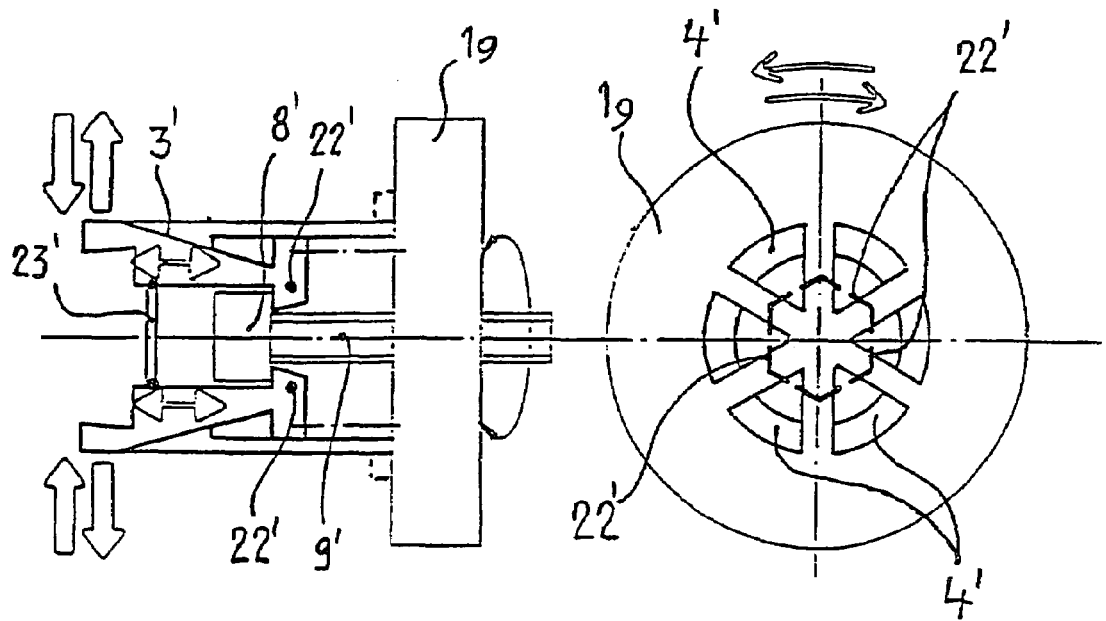

In the embodiment shown in FIGS. 11A and 11B the six clamping blocks 4' are kept together by means of thin rigid clips in the form of an open V and having the function of creating connecting bridges which also form hinging axes for each clamping blocks on the inner base thereof. A circular expansion spring 23' is provided at the outer portion of the clamping block and keeps the clamping blocks 4' pushed against the annular surface 3' of the body 50.

Figures 12A, 12B:
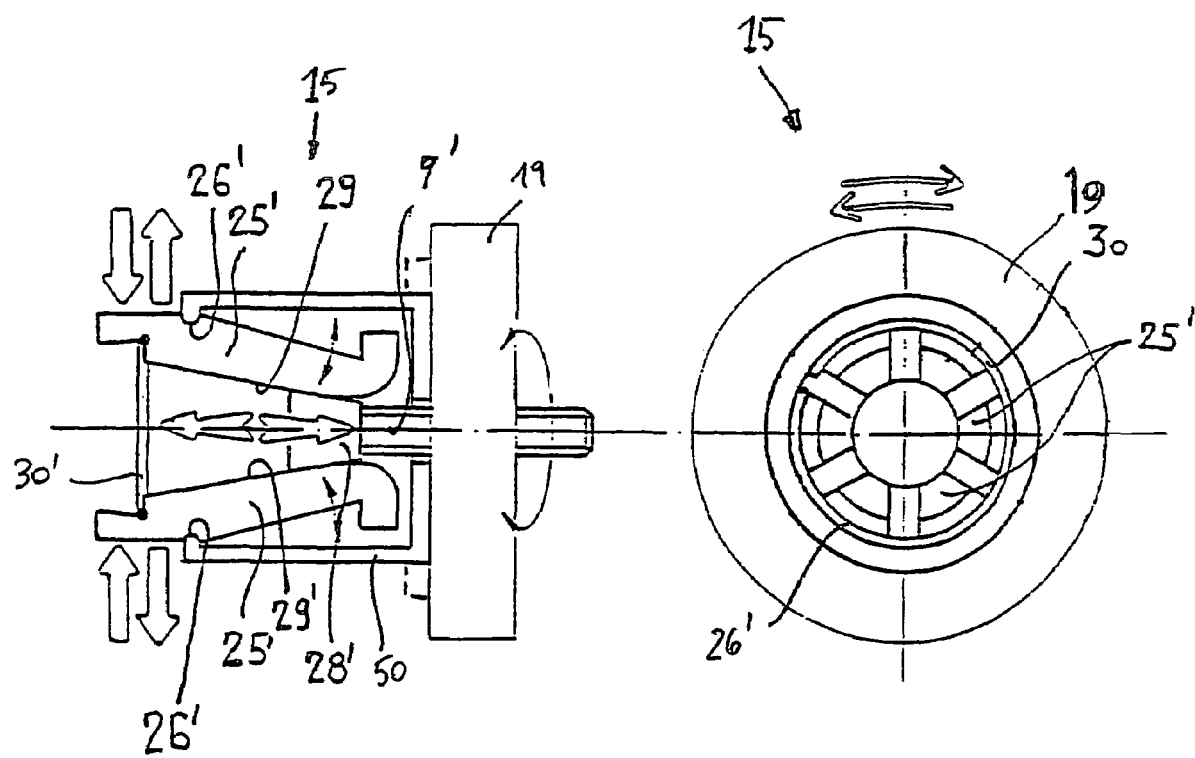

In the embodiment shown in FIGS. 12A and 12B, the clamping element 15 has six floating clamping blocks 25' which are hinged on a pivot-like projection 26' provided at the inlet mouth of the bell-shaped body 50. The threaded shank 9' has a head 28' which has a frustoconical shape able to co-operate with the inclined internal surfaces 29' of the clamping blocks 25'.

Therefore, in this case, the slanted coupling, which allows extraction/retraction of the clamping blocks, is provided between the head 28' and the clamping blocks instead of between the bell-shaped body and the clamping blocks.

Recall of the clamping blocks is performed by means of an expansion spring 10' which is arranged in the outermost portion of the clamping blocks.

In the last embodiment shown in FIGS. 13A and 13B, the clamping element 15 has six independent clamping blocks 35' arranged and hinged on an ordinary washer 36' mounted on a threaded bolt 37' which passes through the collar 17. A bell-shaped cylindrical wall 39', which has a chamfered internal wall of decreasing thickness 40', extends from the collar 17. Finally, the set of clamping blocks 35' positioned and hinged on the washer 36' is held together by means of an O-ring 42' provided inwardly of the washer 36'. This O-ring, in view of its location, allows the clamping blocks to be forced into the open position.

In this case, moreover, the stepped shape of the clamping blocks has been pronounced so as to form a hook shape which can be clearly seen and understood in FIG. 13A.

It is understood that the stepped shape of the outer end of the clamping blocks may be modified in the most suitable manner. For example it is possible to envisage also that the internal surface of this clamping block end is shaped with three adjacent faces having a different inclination: this would allow three different bolt sizes to be adequately gripped.

As can be understood, owing to the configuration of these latter innovative embodiments, the system of the invention is applicable to a wide variety of bolts without any component having to be replaced. This constitutes an undeniable advantage for the purchaser and perfectly achieves one of the objects mentioned in the introduction.

It is understood, however, that the invention is not limited to the particular configurations as illustrated above, which only form non-limiting examples of the scope of the invention, but that numerous variants are possible, all within the reach of a person skilled in the art, without thereby departing from the scope of the said invention.

In particular, the system has been described with reference to two resilient arms 21 and 22. It is however possible to envisage, for example, three arms for the models useful for equipping motor vehicles with very large wheels.

Moreover, although the chamfer angle on the bell-shaped body has always been illustrated as diverging towards the outside, a similar operating principle and design could be obtained with the chamfer converging towards the outside.

The invention claimed is:

1. An anti-skid system for vehicle wheels, comprising:
   gripping elements available for contact with a tread of the wheel arranged at free ends of arms (21, 22) connected to a central connecting body;
   a clamping element (15) apt to be fastened to a bolt of a rim of said wheel; and
   a constraining assembly able to establish a connection between said arms (21, 22) and said clamping element (15), wherein said constraining assembly comprises:
   a collar (17), integral with said clamping element (15),
   a connecting rod (18), carrying a constraining bracket (38) and freely slidable through said collar (17),
   a threaded operating pin (16) extending from the clamping element (15) passing through said collar (17), and
   an operating knob (19) screwable on said threaded operating pin (16) of the clamping element (15) in opposition to said collar (17).

2. The anti-skid system according to claim 1, wherein said constraining assembly further comprises:
   a non-extendable chain (30) connected to a constraining element (18) fixed to the clamping element (15) and which passes through said connecting body (26), the connecting body having a flared shape which is provided, at an inlet mouth of said connecting body (26), with at least one radial groove (31, 32, 33, 34) inside said connecting body (26) which a link of the chain (30) may be inserted edgewise so as to obtain the desired locking action.

3. The anti-skid system according to claim 2, wherein the free end of said chain has resilient fastening means (35, 36) able to keep said chain adherent to the anti-skid system.

4. The anti-skid system according to claim 1, wherein said arms have an elbow shape, the fold of the elbow being intended to come into contact with the rim (12) of the vehicle wheel.

5. The anti-skid system according to claim 1, wherein the clamping element (15) has a collar (17) from which projects a bell-shaped body (50) having, at least in an inlet mouth portion, a chamfered internal surface (51) able to co-operate with a corresponding chamfered surface of an internal sleeve (52) which can be engaged with and tightened on a bolt (13, 14) of the rim, said sleeve (52) being able to slide inside the bell-shaped body (50) actuated by said threaded pin (16) protruding from the collar (17) and displaced by the operating knob (19) which can be screwed on said pin (16) in opposition to said collar (17).

6. The anti-skid system according to claim 5, wherein said sleeve (52) has a circular base from which a series of deformable finger elements (52a) integrally extend, said elements being able to close together around the bolt (13, 14) of the rim when the sleeve is displaced inside the bell-shaped body (50).

7. A package, comprising:
 a system according to claim 1; and
 a plurality of sleeves (52) of different sizes able to be engaged with bolts of varying sizes.

8. A clamping element for an anti-skid system according to claim 1, comprising:
 a jaw component able to clamp a bolt and tightening means able to produce a relative movement between the jaw component and a containing body shaped so as to gradually constrict the jaw body around the bolt, wherein the jaw body comprises a plurality of independent clamping blocks (4', 25', 35') which are joined together by resilient means (5', 10', 20', 23', 30', 42').

9. The clamping element for an anti-skid system according to claim 8, wherein a bell-shaped body (50) inside which the clamping blocks (4') slide, has, at least in the inlet mouth portion, a chamfered internal surface (3') against which the chamfered external surface of the clamping blocks (4', 35') slides.

10. The clamping element for an anti-skid system according to claim 8, wherein said resilient means are compression springs (5') arranged circumferentially between the adjacent surfaces of said clamping blocks (4').

11. The clamping element for an anti-skid system according to claim 8, wherein said resilient means are pieces of rubber or synthetic material (10') fixed by means of bonding, vulcanization or mechanically onto the opposite surfaces of the adjacent clamping blocks.

12. The clamping element for an anti-skid system according to claim 8, wherein said resilient means consist of an elastic-washer retaining spring (20') engaged in slits (21') formed in the internal portion of the clamping blocks (4'), the washer exerting a pre-compressive force tending to displace the clamping blocks (4') away from each other.

13. The clamping element for an anti-skid system according to claim 8, wherein said resilient means consist of a resilient expansion ring (23') arranged in a groove formed in the internal surface of the external portion of the clamping blocks (4').

14. The clamping element for an anti-skid system according to claim 8, wherein said resilient means comprise an O-ring (42') arranged in the internal portion of the clamping blocks (35'), said blocks (35') resting on an internal washer (36').

15. The clamping element for an anti-skid system according to claim 8, wherein said clamping blocks (41, 25') have an external end which is step-shaped.

16. The clamping element for an anti-skid system according to claim 15, wherein said clamping blocks (4') have an external end with several adjacent faces having different inclinations.

17. The clamping element for an anti-skid system according to claim 8, wherein said tightening means comprise a shank (9') engaged with said clamping blocks (4', 25', 35'), passing through a support collar (17) and translation driven by an operating member (19) acting in opposition to said collar.

* * * * *